(12) United States Patent
Shaw

(10) Patent No.: US 11,874,108 B2
(45) Date of Patent: Jan. 16, 2024

(54) PIPE/SQUARE ALIGN

(71) Applicant: Robert Shaw, Louisa, VA (US)

(72) Inventor: Robert Shaw, Louisa, VA (US)

( * ) Notice: Subject to any disclaimer, the term of this patent is extended or adjusted under 35 U.S.C. 154(b) by 0 days.

(21) Appl. No.: 17/747,842

(22) Filed: May 18, 2022

(65) Prior Publication Data

US 2022/0373315 A1 Nov. 24, 2022

Related U.S. Application Data

(60) Provisional application No. 63/190,046, filed on May 18, 2021.

(51) Int. Cl.
*G01B 5/25* (2006.01)
*G01B 5/00* (2006.01)
*F16L 1/10* (2006.01)

(52) U.S. Cl.
CPC .............. *G01B 5/25* (2013.01); *F16L 1/10* (2013.01); *G01B 5/0004* (2013.01)

(58) Field of Classification Search
CPC ........ G01B 5/25; G01B 5/0004; G01B 3/566; F16L 1/10; B23K 37/0533
See application file for complete search history.

(56) References Cited

U.S. PATENT DOCUMENTS

| | | | | |
|---|---|---|---|---|
| 6,427,993 B1* | 8/2002 | Prochac | ............. | B23K 37/0533 269/45 |
| 6,622,395 B1* | 9/2003 | Hickey | ................. | B25H 7/005 33/529 |
| 7,178,252 B1* | 2/2007 | Belgard | ................. | G01B 3/563 33/529 |
| 10,234,257 B2* | 3/2019 | Babich | ................. | G01B 21/047 |
| 11,137,239 B2* | 10/2021 | Riopel | ................... | G01B 5/245 |
| 11,525,526 B1* | 12/2022 | Hentkowski | ........... | H02G 3/263 |
| 2002/0066774 A1* | 6/2002 | Prochac | ............. | B23K 37/0533 228/44.3 |
| 2007/0245581 A1* | 10/2007 | Hios | ........................ | B43L 7/10 33/429 |
| 2008/0148587 A1* | 6/2008 | Goodrich | ............... | G01B 3/566 33/529 |
| 2017/0211919 A1* | 7/2017 | Babich | ....................... | B43L 7/00 |
| 2021/0190467 A1* | 6/2021 | Riopel | ..................... | G01C 9/28 |
| 2022/0373315 A1* | 11/2022 | Shaw | ........................ | F16L 1/10 |

* cited by examiner

*Primary Examiner* — Yaritza Guadalupe-McCall

(57) ABSTRACT

An alignment apparatus suited for aligning structural members, such as, but not limited to pipes, structural beams, lumber, or any other suitable member. The alignment apparatus comprises a mounting base, an alignment receiver, and a fastening element. The mounting base comprises a first mounting body, a mounting cavity, and a second mounting body. The alignment receiver comprises a first receiver panel, an alignment cavity, a fastening aperture, and a second receiver panel. The mounting base is perpendicularly connected adjacent to the alignment receiver. The first receiver panel and the second receiver panel are vertically connected adjacent to the mounting base. The alignment cavity is positioned between the first receiver panel and the second receiver panel. The fastening aperture traverses through the first receiver panel. The fastening element is selectively connected along the fastening aperture.

10 Claims, 4 Drawing Sheets

PIPE/SQUARE ALIGN

FIELD OF THE INVENTION

The present invention relates generally to a Pipe/Square Align. More specifically, the present invention is a device that is used for aligning pipes or structural steel members of different lengths.

BACKGROUND OF THE INVENTION

Companies in this industry are primarily engaged in manufacturing metal cutlery, nonpowered hand and edge tools, saw blades, metal kitchen utensils, and metal kitchen pots and pans. Major US companies include Johnson level and tool, Swanson, Empire Level, Milwaukee, Stanley. The US hand tool, cutlery, and flatware industry includes about 1,100 companies with combined annual revenue of about $10 billion.

An objective of the present invention is to provide users with generally pipe aligner. Thus, the present invention is a Pipe Align or Square Align are a pair of "L" shaped framing squares having a plurality of magnetic right-angle clamps capable of being removably secured about a given length of pipe.

SUMMARY OF THE INVENTION

The present invention is an alignment apparatus suited for aligning pipes for welding. The alignment apparatus comprises a mounting base, an alignment receiver, and a fastening element. The mounting base comprises a first mounting body, a mounting cavity, and a second mounting body. The alignment receiver comprises a first receiver panel, an alignment cavity, a fastening aperture, and a second receiver panel. The mounting base is perpendicularly connected adjacent to the alignment receiver. The first mounting body and the second mounting body is connected terminally opposite to each other along the mounting base. The mounting cavity is positioned between the first mounting body and the second mounting body, opposite to the alignment receiver. The first receiver panel is vertically connected adjacent to the first mounting body. The second receiver panel is vertically connected adjacent to the second mounting body. The alignment cavity is positioned between the first receiver panel and the second receiver panel. The fastening aperture traverses through the first receiver panel. The fastening element is selectively connected along the fastening aperture, wherein the fastening element is configured to selectively operate in an open configuration and a closed configuration along the alignment cavity.

DETAIL DESCRIPTIONS OF THE INVENTION

Figure 1:
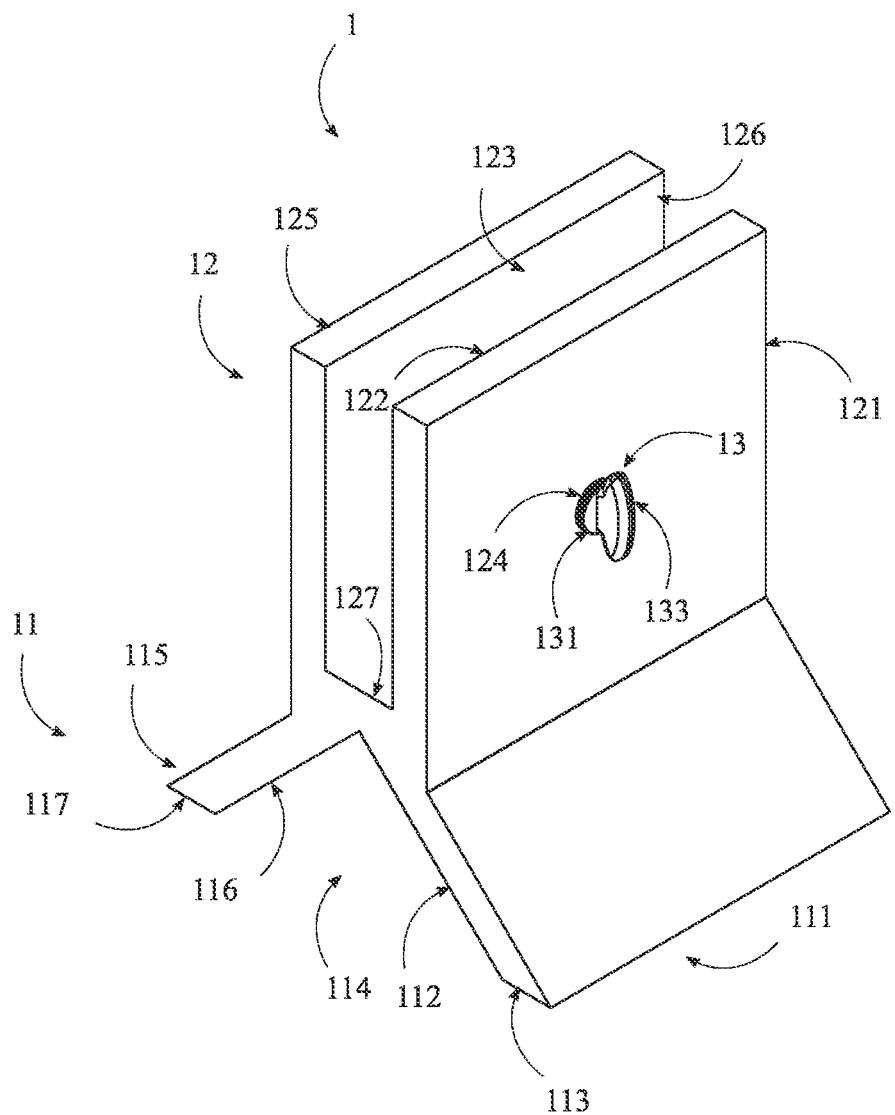
FIG. 1 is a top perspective view of the present invention.
Figure 2:
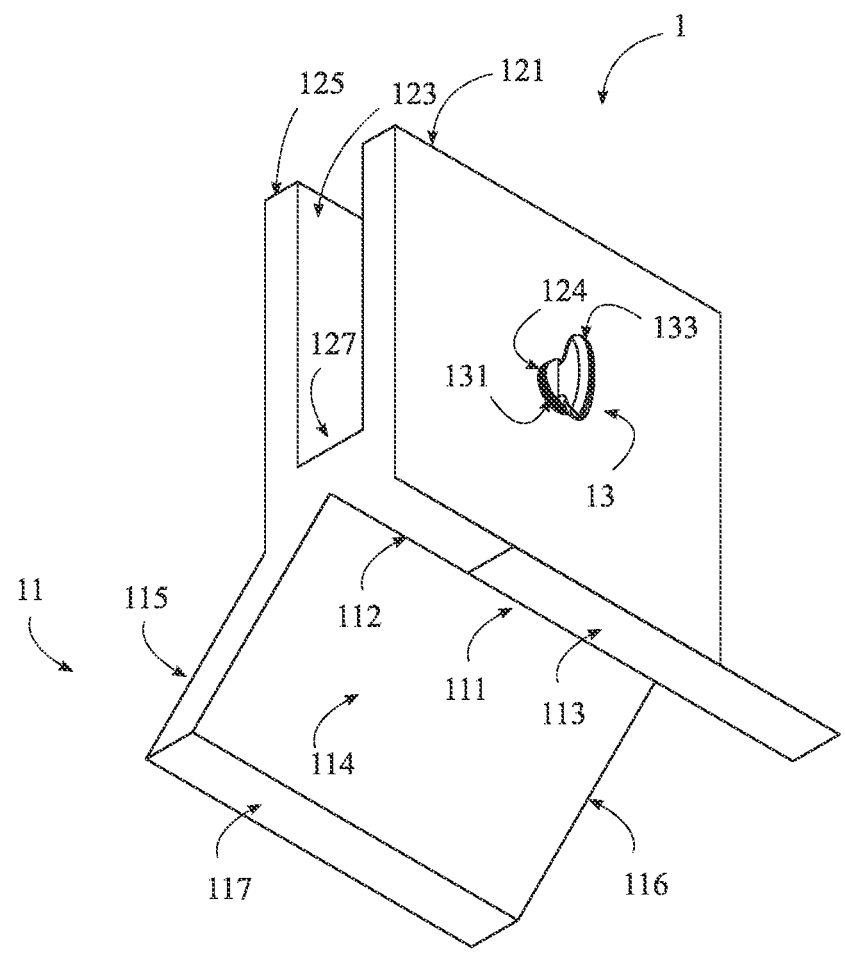
FIG. 2 is a bottom perspective view of the present invention.
Figure 3:
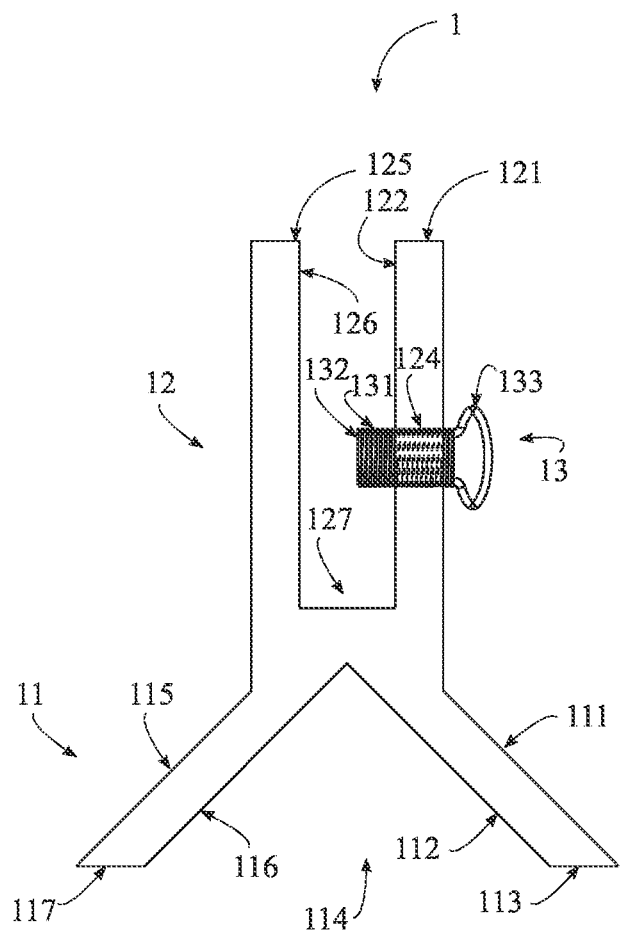
FIG. 3 is a front view of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

In reference to FIGS. 1-4, the present invention is an alignment apparatus 1 suited for aligning structural members, such as, but not limited to pipes, structural beams, lumber, or any other suitable member. The alignment apparatus 1 comprises a mounting base 11, an alignment receiver 12, and a fastening element 13. The mounting base 11 comprises a first mounting body 111, a mounting cavity 114, and a second mounting body 115. The alignment receiver 12 comprises a first receiver panel 121, an alignment cavity 123, a fastening aperture 124, and a second receiver panel 125. The mounting base 11 is perpendicularly connected adjacent to the alignment receiver 12. The first mounting body 111 and the second mounting body 115 is connected terminally opposite to each other along the mounting base 11. The mounting cavity 114 is positioned between the first mounting body 111 and the second mounting body 115, opposite to the alignment receiver 12. The first receiver panel 121 is vertically connected adjacent to the first mounting body 111. The second receiver panel 125 is vertically connected adjacent to the second mounting body 115. The alignment cavity 123 is positioned between the first receiver panel 121 and the second receiver panel 125. The fastening aperture 124 traverses through the first receiver panel 121. The fastening element 13 is selectively connected along the fastening aperture 124, wherein the fastening element 13 is configured to selectively operate in an open configuration and a closed configuration along the alignment cavity 123. In the preferred embodiment, the alignment apparatus 1 is suited for squaring and aligning pipes positioned along stands in order to weld and conjoin the aligned pipes together. In the preferred embodiment, the alignment apparatus 1 takes the form of a plurality of alignment apparatus' 1, where the plurality of alignment apparatus' 1 is longitudinally distributed about the pipes to be aligned.

Figure 4:
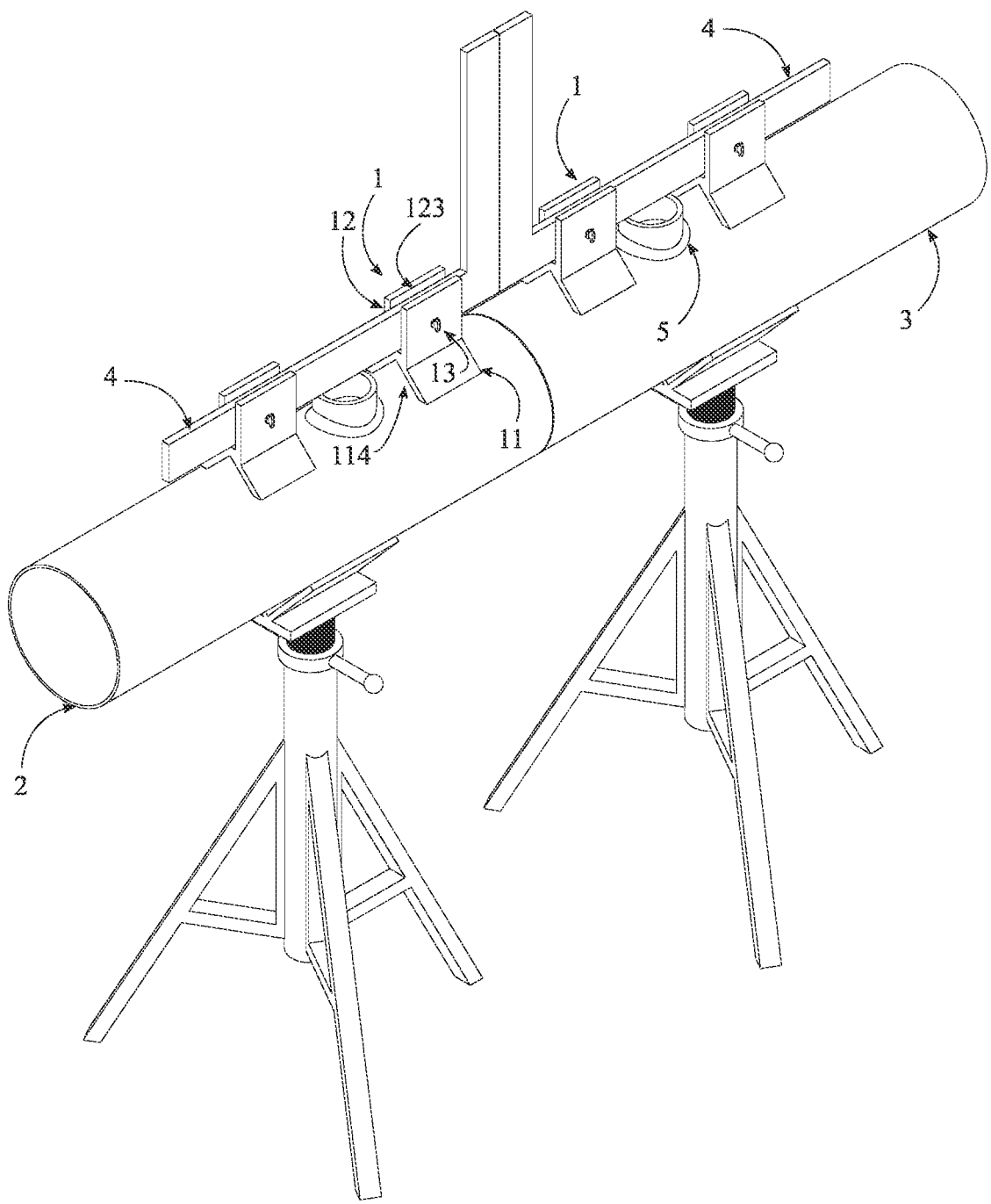
FIG. 4 is a diagram view of the present invention that shows the present invention installed along a couple of pipes and L-squares.

In the preferred embodiment, two L-shaped alignment squares 4 are fixed along the plurality of alignment apparatus' 1, where one L-shaped alignment square 4 is fixed along the plurality of alignment apparatus' 1 distributed along one pipe 2, while the other L-shaped alignment square 4 is fixed along the plurality of alignment apparatus' 1 distributed along the other pipe 3. The two L-shaped alignment squares 4 are oriented in a fashion where the pipes are squared and axially aligned to each other, serving as a suitable means of axially aligning the two pipes together for welding. In the preferred embodiment, the two L-shaped alignment squares 4 are raised along the present invention such that they bypass weldolets, or any other protrusion interferences, as shown in FIG. 4. In the preferred embodiment, the alignment apparatus 1 is made out of any suitable material, such as, but not limited to aluminum, steel, or any other suitable material. In the preferred embodiment, the alignment apparatus 1 takes the form of a one-piece unibody construction, such as, but not limited to aluminum extrusion, machined body, or any other suitable construction means.

In the preferred embodiment, the mounting base 11 takes the form of any suitable pipe mounting implement that secures, axially aligns, and stabilizes the alignment apparatus 1 along any suitable pipe surface. In the preferred embodiment, the mounting base 11 is made out of a magnet material, such that the mounting base 11 magnetically attaches along a magnetic surface. In the preferred embodiment, the alignment receiver 12 serves as the primary mounting platform for the L-square. In the preferred embodiment, the fastening element 13 takes the form of any suitable fastening implement in securing and selectively attaching the L-square along the alignment receiver 12. In the preferred embodiment, the first mounting body 111 and the second mounting body 115 takes the form of any suitable structural element that mounts and contours along any suitable pipe surface. In the preferred embodiment, the first mounting body 111 and the second mounting body 115 takes the form of angle iron flanges but may take the form of any other suitable body implement. In the preferred embodiment, the mounting cavity 114 takes the form of the clearance projected between the first mounting body 111 and the second mounting body 115, where the mounting cavity 114 facilitates any suitable pipe diameter profile. In the preferred embodiment, the first receiver panel 121 and the second receiver panel 125 take the form vertically emplaced structural panels that mounts the L-square along the alignment receiver 12 portion of the alignment apparatus 1. In the preferred embodiment, the alignment cavity 123 serves as the opening between the first receiver panel 121 and the second receiver panel 125 that receives the L-square.

The first mounting body 111 comprises a first interior receiving surface 112. The first interior receiving surface 112 traverses along the first mounting body 111. The second mounting body 115 comprises a second interior receiving surface 116. The second interior receiving surface 116 traverses along the second mounting body 115. The first mounting body 111 comprises a first mounting end 113. The first mounting end 113 is terminally positioned adjacent to the first mounting body 111, opposite from the first receiver panel 121. The second mounting body 115 comprises a second mounting end 117. The second mounting end 117 is terminally positioned adjacent to the second mounting body 115, opposite from the second receiver panel 125.

The first receiver panel 121 comprises a first interior alignment surface 122. The first interior alignment surface 122 traverses along the first receiver panel 121. The second receiver panel 125 comprises a second interior alignment surface 126. The second interior alignment surface 126 traverses along the second receiver panel 125. In the preferred embodiment, the first interior receiving surface 112 takes the form of the interior surface traversing along the first mounting body 111. More specifically, the first interior surface is the portion of the first mounting body 111 that comes into contact with the pipe surface the mounting base 11 sits along. In the preferred embodiment, the second interior receiving surface 116 takes the form of the interior surface traversing along the second mounting body 115. More specifically, the second interior surface is the portion of the second mounting body 115 that comes into contact with the pipe surface the mounting base 11 sits along. In the preferred embodiment, the first mounting end 113 takes the form of the surface end terminally positioned along the first mounting body 111. More specifically, the first mounting end 113 is the portion of the first mounting body 111 that comes into contact with the pipe surface if the pipe diameter overlaps along the mounting cavity 114. In the preferred embodiment, the second mounting end 117 takes the form of the surface end terminally positioned along the second mounting body 115. More specifically, the second mounting end 117 is the portion of the second mounting body 115 that comes into contact with the pipe surface if the pipe diameter overlaps along the mounting cavity 114. In the preferred embodiment, the first interior alignment surface 122 takes the form of the interior surface of the first receiver panel 121 that the L-shaped alignment square 4 sits along. In the preferred embodiment, the second interior alignment surface 126 takes the form of the interior surface of the second receiver panel 125 that the L-shaped alignment square 4 sits along, working in conjunction with the first receiver panel 121.

The alignment receiver 12 comprises a receiving end 127. The receiving end 127 is terminally positioned adjacent to the alignment cavity 123. The receiving end 127 is positioned between the alignment receiver 12 and the mounting base 11. In the preferred embodiment, the receiving end 127 takes the form of the end that the L-square sits flush along the alignment cavity 123. The fastening element 13 comprises a fastening body 131, a fastening end 132, and a fastening knob 133. The fastening end 132 and the fastening knob 133 is terminally connected opposite to each other along the fastening body 131. The fastening body 131 is selectively engaged along the fastening aperture 124. In the preferred embodiment, the fastening element 13 takes the form of any suitable fastening element 13, such as, but not limited to threaded fasteners, clamps, or any other suitable type of fastening implement. In the preferred embodiment, the fastening body 131 takes the form of a threaded fastening implement that engages along the fastening aperture 124. In the preferred embodiment, the fastening end 132 serves as the attachment end of the fastening element 13 that fixes the L-square along the alignment receiver 12. In the preferred embodiment, the fastening knob 133 takes the form of any suitable grasping element that allows the user to selectively operate the fastening element 13 along the fastening aperture 124 to an open configuration or a closed configuration along the alignment cavity 123.

Although the invention has been explained in relation to its preferred embodiment, it is to be understood that many other possible modifications and variations can be made without departing from the spirit and scope of the invention as hereinafter claimed.

What is claimed is:

1. A alignment apparatus comprising:
a mounting base;
an alignment receiver;
the mounting base comprising a first mounting body, a mounting cavity, and a second mounting body;
the alignment receiver comprising a first receiver panel, an alignment cavity, and a second receiver panel;
the mounting base being perpendicularly connected adjacent to the alignment receiver;
the first mounting body and the second mounting body being connected terminally opposite to each other along the mounting base;
the mounting cavity being positioned between the first mounting body and the second mounting body, opposite to the alignment receiver;
the first receiver panel being vertically connected adjacent to the first mounting body;
the second receiver panel being vertically connected adjacent to the second mounting body;
the alignment cavity being positioned between the first receiver panel and the second receiver panel;
the alignment receiver comprising a receiving end;

the receiving end being terminally positioned adjacent to the alignment cavity; and the receiving end being positioned between the alignment receiver and the mounting base.

2. The alignment apparatus as claimed in claim 1 comprising:

the first mounting body comprising a first interior receiving surface; and the first interior receiving surface traversing along the first mounting body.

3. The alignment apparatus as claimed in claim 1 comprising:

the second mounting body comprising a second interior receiving surface; and the second interior receiving surface traversing along the second mounting body.

4. The alignment apparatus as claimed in claim 1 comprising:

the first mounting body comprising a first mounting end; and the first mounting end being terminally positioned adjacent to the first mounting body, opposite from the first receiver panel.

5. The alignment apparatus as claimed in claim 1 comprising:

the second mounting body comprising a second mounting end; and the second mounting end being terminally positioned adjacent to the second mounting body, opposite from the second receiver panel.

6. The alignment apparatus as claimed in claim 1 comprising:

the first receiver panel comprising a first interior alignment surface; and the first interior alignment surface traversing along the first receiver panel.

7. The alignment apparatus as claimed in claim 1 comprising:

the second receiver panel comprising a second interior alignment surface; and the second interior alignment surface traversing along the second receiver panel.

8. The alignment apparatus as claimed in claim 1 comprising:

a fastening element the fastening element comprising a fastening body, a fastening end, and a fastening knob;

the fastening end and the fastening knob being terminally connected opposite to each other along the fastening body; and the fastening body being selectively engaged along the fastening aperture.

9. The alignment apparatus as claimed in claim 8 comprising:

the alignment receiver comprising a fastening aperture;

the fastening aperture traversing through the first receiver panel; and the fastening element being selectively connected along the fastening aperture, wherein the fastening element is configured to selectively operate in an open configuration and a closed configuration along the alignment cavity.

10. The pipe alignment apparatus as claimed in claim 1, wherein the mounting base is made out of a magnet material.

* * * * *